UNITED STATES PATENT OFFICE.

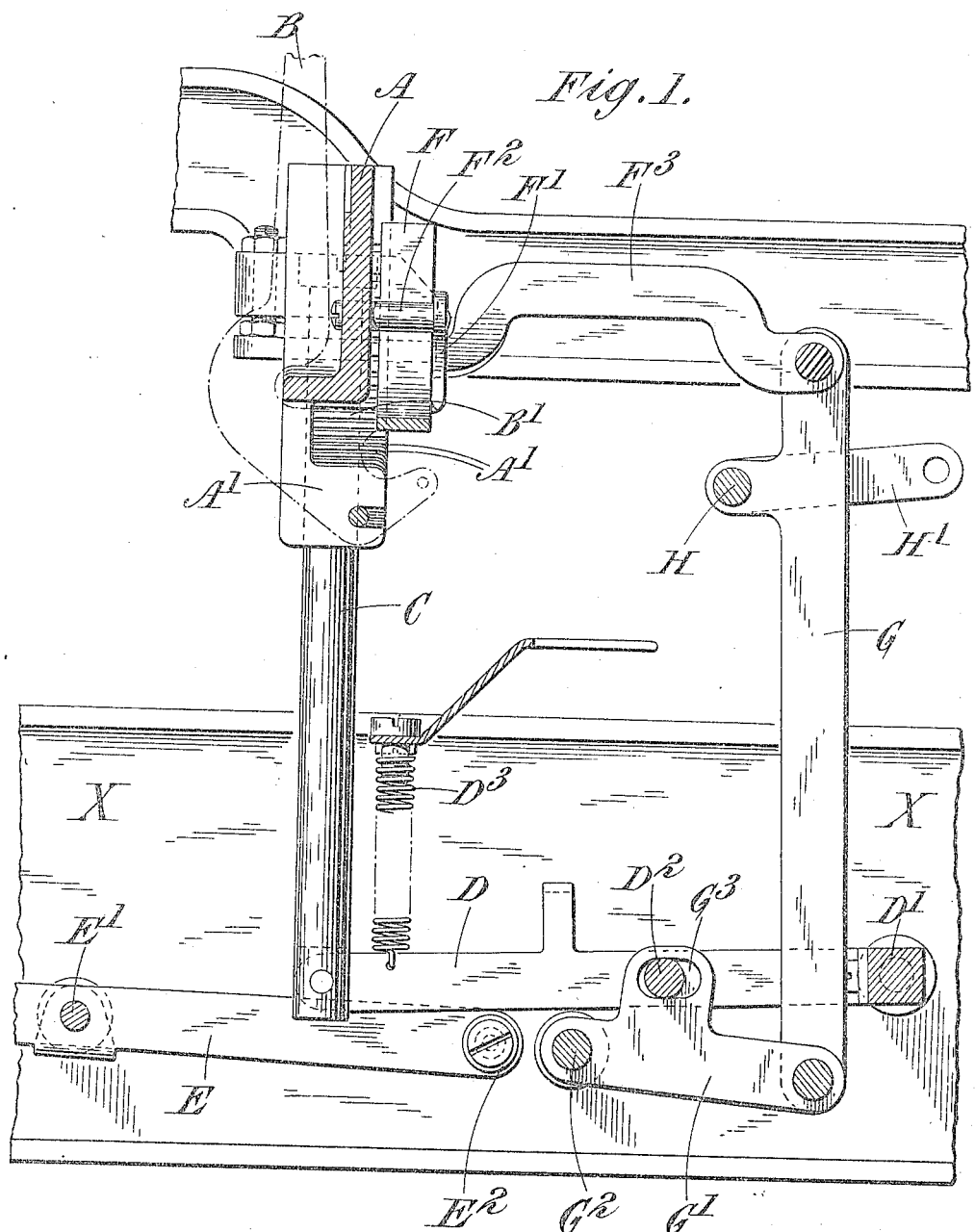

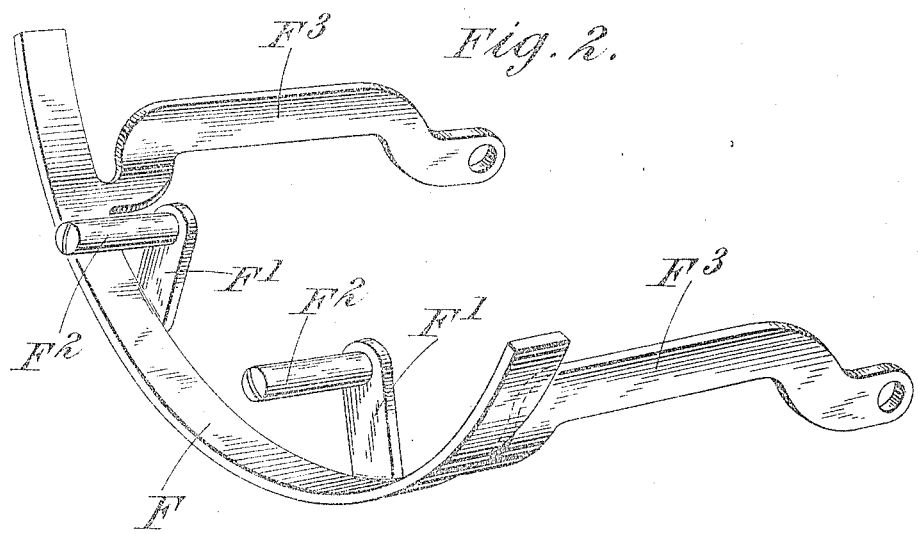

HERBERT ETHERIDGE, OF EALING, LONDON, ENGLAND, ASSIGNOR TO THE BAR-LOCK TYPEWRITER COMPANY, LIMITED, OF LONDON, ENGLAND.

SHIFT-KEY MECHANISM OF TYPE-WRITERS.

1,207,385.   Specification of Letters Patent.   Patented Dec. 5, 1916.

Application filed March 22, 1916. Serial No. 85,803.

*To all whom it may concern:*

Be it known that I, HERBERT ETHERIDGE, a subject of the King of England, residing at Ealing, London, W., England, have invented certain new and useful Improvements in Shift-Key Mechanism of Type-Writers, of which the following is a specification.

This invention is for improvements in or relating to shift-key mechanism of typewriters of the kind wherein the type-bar segment or other frame is shifted bodily by the shift-key, and the invention has for its object to provide a universal bail therefor which shall be operated by the type-bars.

According to this invention, the typewriter shift-key mechanism is characterized by the type-bar segment and universal bail, which latter is carried thereby and which are actuated by a shift-key, the connections between the segment and universal bail being such that both are moved by the shift-key, without changing the relative positions of the universal bail and type-bar segment, so that the relation of the type-bars to the universal bail remains the same for all positions of the segment. Preferably the bail is slidingly carried on the type-bar segment in such manner that it moves with the frame when operated by the shift-key, and slides thereon when operated by the type-bars. The bail may slide back and forth on approximately horizontal guides and it may have rearwardly extending arms (preferably rigid with the bail) connected to long downwardly-directed links for the purpose of supporting the bail while allowing it what for all practical purposes is a true horizontal movement, means being provided for shifting the said links upward with the type-bar segment by the shift-key so as not to disturb the relations between the said frame and the universal bail.

In the accompanying drawings which illustrate one method of carrying out this invention: Figure 1 is a section through the shift-key mechanism in a vertical plane from front to back of the machine, and Fig. 2 is a perspective view of the bail.

The same letters indicate the same parts in both figures.

The segment A is provided with a series of transverse slots $A^1$, as is common practice, to receive the type-bars, one of which is indicated in chain-line at B. The segment is mounted to rise and fall in vertical guides which in themselves form no part of the present invention and therefore need not be described in this specification, and each end of the segment is carried by a vertical rod C, one only of which is shown in Fig. 1 as the other one would be attached to that part of the segment which does not appear in this sectional view. The rod C is pivoted to the free end of a two-armed lifting-member D. Only one arm of the lifting-member is shown in the drawing, the other arm being omitted with the corresponding rod C, but the two arms are secured together by a transverse shaft $D^1$ and a transverse stiffening-rod $D^2$. The arms of the lifting-member D extend rearwardly from the rods C and the shaft $D^1$ is secured to the rear ends of these arms. The lifting-member is pivoted to the frame X of the machine by means of the shaft $D^1$, so that the arms D can rock in a vertical plane.

A shift-key E is pivoted to the frame X at $E^1$ and beyond this is provided with a roller $E^2$ which lies beneath one of the arms D of the lifting-member. A shift-key may be provided on each side of the machine, one under each arm D as will be readily understood. Springs $D^3$, one for each arm D, are provided to counterbalance in some measure the weight of the segment A and its associated parts.

The bail F is of segmental form and is provided with ears $F^1$ having screwed into them pins $F^2$ which extend through orifices in the segment A so that they afford a sliding connection between the bail and the segment to permit the bail to move in a horizontal plane. The segment has made, integrally with it, two rearwardly extending arms F³ and long depending links G (one only being shown in the drawings) are pivoted to these arms, one to each arm. The ends of the links G are pivoted to the ends of arms G¹, one on each side of the machine (one only being shown in the drawings) which arms are secured to a transverse rod G² mounted to pivot in the frame X about a horizontal axis. Each arm of the member G¹ is slotted at G³ to receive the transverse rod D² of the lifting-member D. A stiffening-rod H connects the links G and is secured in ears thereon. On this rod, midway between the two links G is pivoted a link H¹.

The operation of this mechanism is as follows: When either of the shift-keys is depressed the roller E² is made to bear against the corresponding arm of the lifting-member D so that the member is rocked upward, and by means of the rods C lifts the segment A the required distance for changing from, say, lower case type to upper case type. The bail F being carried on the segment A by means of the screws F² goes up with the segment and is kept parallel to the segment by the links G being simultaneously raised. This is effected by the engagement of the stiffening-rod D² with the slotted arms G¹, so that as the lifting-member D rises, the arms G¹ are rocked upward and thus lift the links G. The parts are so proportioned that the lift of the links G is sufficient to move the ends of the arms F³ of the bail upward the same amount as the bail itself is raised. The relations between the segment A and the universal bail F are thus undisturbed whichever position the segment may be set in.

The type-bars are provided with heels B¹, which heels strike against the bail as the bar is brought to the striking position in which the one indicated in chain-line is shown. The bail is thus thrust back by each type-bar and so slides backward and forward on the screws F². The movement of the bail is imparted to the escapement-dogs and ribbon-mechanism in any well-known manner by means of the link H¹. It will be observed that the links G are of considerable length so that the backward and forward movement of the bail can take place without any appreciable tilting.

Obviously the mounting for the bail F may be mounted on the segment in other ways than that shown, and other changes may be made without departing from the invention as claimed.

What I claim as my invention and desire to secure by Letters Patent is:—

1. In a typewriter shift-key mechanism, the combination of, a type-bar segment movable bodily in a vertical plane, type-bars pivoted thereon and movable bodily with the frame, a plurality of type-characters on each bar, a shift-key operatively connected to the frame to move it to bring the different type on the type-bars into writing position, a bail carried by the segment to move bodily therewith and guided to move in a horizontal path thereon when struck by each type-bar, the said bail having rearwardly-extending arms, long links depending from said arms, and operative connection between the said links and the shift-key such that when the segment is raised and lowered the rear-ends of the bail-arms are correspondingly raised and lowered, substantially as and for the purpose set forth.

2. In a typewriter shift-key mechanism, the combination of, a type-bar segment movable bodily in a vertical plane, type-bars pivoted thereon and movable bodily with the segment, a plurality of type characters on each bar, a shift-key operatively connected to the segment to move it to bring the different type on the type-bars into writing position, a bail having two horizontal pins whereby its forward end is slidingly carried on the segment to move backward and forward relatively to the same under the action of the type-bars but bodily with the vertical movements of the segment under the action of its shift-key, the said bail having rearwardly-extending arms, links depending from said arms, and operative connection between the said links and the shift-key such that when the segment is raised and lowered the rear-ends of the bail arms are correspondingly raised and lowered, substantially as set forth.

3. In a typewriter shift-key mechanism, the combination of, a type-bar segment movable bodily in a vertical plane, type-bars pivoted thereon and movable with the segment, a plurality of type-characters on each bar, a lifting-member having approximately horizontal arms pivoted near the base and toward the back of the machine and extending forward, vertical rods secured at their upper ends to the type-bar segment and at their lower ends pivoted one to each arm of the lifting-member, a shift-key pivoted between its ends and having that end remote from the key operatively engaged with one of the arms of the lifting-member to raise the same when the key is depressed for the purpose of raising the type-bar segment to bring the different type-characters on the type-bars into writing position, a bail movable bodily with the type-bar segment and carried at its forward end by guides which enable it to slide on a horizontal path backward and forward under the action of the type-bars, the said bail having rearwardly-extending arms, long links depending from said arms, an approximately horizontal arm pivoted to the lower end of each depending link and extending forward to a fulcrum point, means for operatively connecting both of the horizontal arms with the shift-key so that they are raised therewith to raise the rear ends of the arms of the bail when the forward end is raised with the type-bar segment, substantially as set forth.

4. In a typewriter shift-key mechanism, the combination of, a type-bar segment movable bodily in a vertical plane, type-bars pivoted thereon and movable with the segment, a plurality of type characters on each bar, a lifting-member having approximately horizontal arms pivoted near the base and toward the back of the machine and extending forward, vertical rods secured at their upper ends to the type-bar segment and at their lower ends pivoted one to each arm of the lifting-member, a shift-key pivoted between its ends and having that end remote from the key operatively engaged with one of the arms of the lifting-member to raise the same when the key is depressed for the purpose of raising the type-bar segment to bring the different type characters on the type-bars into writing position, a bail movable bodily with the type-segment and carried at its forward end by guides which enable it to slide in a horizontal path backward and forward under the action of the type-bars, the said bail having rearwardly-extending arms, long links depending from said arms, an approximately horizontal arm pivoted to the lower end of each depending link and extending forward to a fulcrum point, one of the said horizontal arms being slotted, and having operative engagement with the other, the said slot having sliding engagement with a member operatively engaged with the shift-key so that the horizontal arms are raised thereby when the shift-key is operated, substantially as set forth.

5. In a typewriter shift-key mechanism, the combination of, a type-bar segment movable bodily in a vertical plane, type-bars pivoted thereon and movable with the segment, a plurality of type characters on each bar, a lifting-member having approximately horizontal arms pivoted near the base and toward the back of the machine and extending forward, vertical rods secured at their upper ends to the type-bar segment and at their lower ends pivoted one to each arm of the lifting-member, a shift-key pivoted between its ends and having that end remote from the key operatively engaged with one of the arms of the lifting-member to raise the same when the key is depressed for the purpose of raising the type-bar segment to bring the different type characters on the type-bars into writing position, a bail movable bodily with the type-bar segment and carried at its forward end by guides which enable it to slide in a horizontal path backward and forward under the action of the type-bars, the said bail having rearwardly-extending arms, long links depending from said arms, an approximately horizontal arm pivoted to the lower end of each depending link and extending forward to a fulcrum point, the said horizontal arms being slotted and each of the said slots being engaged by a stiffening-rod which connects the arms of the lifting-member so that the horizontal arms are raised when the lifting-member is raised, substantially as set forth.

6. In a typewriter shift-key mechanism, the combination of, a movable type-bar segment so situated that the plane of its circle is vertical, type-bars pivoted thereon and movable bodily with the segment, a plurality of type characters on each bar, a shift-key operatively connected to the segment to move it to bring the different type-characters on the type-bars into writing position, a segmental bail having rearwardly-extending arms one situated near each end of the bail, means for carrying the segmental portion of the bail on the type-bar segment in such manner that it will rise and fall with the segment but can slide back and forth thereon under the action of the type-bars, and means for operatively connecting the rear ends of the bail arms with the shift-key so that these are raised and lowered when the segment is raised and lowered by the shift-key, the operative connection being such as to permit the backward and forward movement of the bail under the action of the type-bars, substantially as set forth.

7. In a typewriter shift-key mechanism, the combination of, a movable type-bar segment, so situated that the plane of its circle is vertical, type-bars pivoted thereon and movable bodily with the segment, a plurality of type characters on each bar, a shift-key operatively connected to the segment to move it to bring the different type-characters on the type-bars into writing position, a segmental bail having rearwardly-extending arms one situated near each end of the bail, horizontally disposed pins providing a sliding connection between the type-bar segment and the bail in such manner that the bail will rise and fall with the segment but can slide back and forth thereon under the action of the type-bars the said bail having ears situated between the aforesaid rearwardly-extending arms to receive the said pins, and means for operatively connecting the rear ends of the bail arms with the shift-key so that these are raised and lowered when the segment is raised and lowered by the shift-key; the operative connection being such as to permit the backward and forward movement of the bail under the action of the type-bars, substantially as set forth.

In testimony whereof I have signed my name to this specification in the presence of two subscribing witnesses.

HERBERT ETHERIDGE.

Witnesses:
 HAROLD H. SIMMONS,
 A. M. HAYWARD.